United States Patent Office 3,092,672
Patented June 4, 1963

3,092,672
DIARYLETHANES BY REACTION OF AROMATICS WITH CARBYL SULFATE
Donald L. Klass, Barrington, Ill., assignor to The Pure Oil Company, Chicago, Ill., a corporation of Ohio
No Drawing. Filed Dec. 2, 1960, Ser. No. 73,195
8 Claims. (Cl. 260—668)

This invention relates to a method for preparing reaction products of carbyl sulfate and aromatic compounds in the presence of a Friedel-Crafts catalyst. Various reactions are known in which a carbocyclic compound reacts with a compound having a carbon-sulfur bond. Insofar as known to the present inventor, in all such reactions, the carbon-sulfur bond is not broken or, if broken, both carbon and sulfur remain attached to other carbon atoms in the reaction product.

I have found, however, that when carbyl sulfate is reacted with an aromatic compound, two molecules of the aromatic compound will combine with the carbyl sulfate in the presence of a Friedel-Crafts catalyst to form a diaromatic ethane derivative, as indicated by the following:

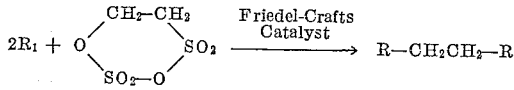

where R is a mono- or polynuclear aromatic radical, free of active side chains, and $R_1$ is an aromatic compound, corresponding to R with an additional hydrogen atom on the ring carbon attached to the $CH_2$ group. The reaction mixture also contains $SO_3$ in admixture with other by-products from which $SO_3$ can be recovered and recycled. Thus, it is possible by means of this novel process to prepare well-known compounds, such as bibenzyl, bitolyl ethane, bixylyl ethane, etc.

An object of this invention is to provide a novel method for preparing compounds in which two aromatic rings are connected by a straight carbon chain. Another object of the invention is to provide a method for preparing diarylethane compounds. A further object of the invention is to provide a method for preparing useful hydrocarbons by reacting aromatic compounds with carbyl sulfate or homologues of carbyl sulfate, such as homologues resulting from reaction of $SO_3$ with any of the following compounds: propylene, butylene, amylene, hexylene, decylene, dodecylene, tetradecylene, octadecylene, cyclohexene, pentadecylene, nonene, polyisobutylene (see 2,036,- 249; 1,913,794; 2,160,343; 2,335,193). Other objects of the invention will become apparent from the following description.

In accordance with my invention, an aromatic compound which is free of reactive substituents, is reacted with carbyl sulfate or a homologue of carbyl sulfate in the presence of a Friedel-Crafts catalyst. Aromatic compounds which may or may not contain alkyl side-chains may be used. As examples of compounds which are suitable as starting materials for my reaction may be mentioned mononuclear aromatic compounds, such as benzene, toluene, ortho-, meta- and para-xylene and mixtures thereof, ethylbenzene, cumene, durene, and polycyclic aromatic compounds, such as naphthalene, anthracene, phenanthrene, biphenylfluorene, asym-diphenylethane, perylene and 1,1'binaphthyl. Aromatic compounds having substituents on the carbon atoms are useful in the synthesis provided the substituents are inert in the reaction environment.

Although I prefer anhydrous aluminum chloride as the Friedel-Crafts catalyst, other Friedel-Crafts catalysts, such as ferric chloride, tin chloride, boron trifluoride, mixtures of hydrogen fluoride and boron trifluoride, titanium tetrachloride and zirconium tetrachloride, may be used. With the weaker Friedel-Crafts catalysts the reaction should be carried out at elevated temperatures to obtain practical conversion rates. With the stronger Friedel-Crafts catalysts, such as aluminum chloride, or boron trifluoride and hydrogen fluoride, the reaction will proceed satisfactorily at room temperature, but can be speeded up by heating the reaction mixture to a temperature at or near the boiling point of the reaction mixture. Thus, for example, in reacting benzene and carbyl sulfate, the reaction mixture may be heated to a temperature of approximately 80° C. Similarly, when reacting toluene and carbyl sulfate, the reaction mixture may be heated to 110° C. Where weaker Friedel-Crafts catalysts, such as tin chloride, are used, it may be desirable to heat the reaction mixture to temperatures above the boiling temperature of the carbocyclic reactant and maintain the system under pressure.

Instead of using pure aromatic compounds in the synthesis, a mixture of aromatic compounds, such as that obtained in the hydroforming of a high-boiling gasoline fraction in the presence of a platinum catalyst, may be used as the starting material. In hydroforming processes of this type, of which the Platforming process is probably best known, a gasoline fraction boiling within the range of about 120–200° C., and containing a substantial portion of naphthenic hydrocarbons of six or more atoms, is contacted with a platinum catalyst under elevated pressure and temperature in the presence of hydrogen. In the process, the naphthenic hydrocarbons are isomerized and dehydrogenated to aromatic hydrocarbons, including benzene, toluene, xylene, ethylbenzene, and heavier aromatics. In accordance with my process, the mixture can be alkylated with carbyl sulfate and the resulting diaryl ethanes subsequently fractionated from each other by distillation, crystallization, or a combination thereof.

In carrying out the synthesis in accordance with my invention, the aromatic compound, or mixture, and the carbyl sulfate should be present in a mol ratio of at least 2 to 1, and preferably in a ratio of between 4 and 20 mols of the aromatic compound to 1 mol of the carbyl sulfate. The reactants may be agitated with a Friedel-Crafts catalyst or may be passed through a bed of the catalyst in a continuous operation. If the reaction is carried out in a batch operation, the Friedel-Crafts catalyst should be present in the mixture in an amount equivalent to about 0.5 mol of Friedel-Crafts catalyst to each mol of the aromatic reactant, and may be as high as 0.5 mol or greater. Larger or smaller amounts of catalysts may be used; however, smaller amounts result in less complete reaction and larger amounts do not yield any additional benefits. The following examples will illustrate the invention.

*Example I*

A 78-gram portion of benzene was placed in a three-neck flask equipped with a thermometer, stirrer and condenser. There was added to the flask 22.7 grams (0.2 mol) of powdered anhydrous aluminum chloride and then 18.8 grams (0.1 mol) of carbyl sulfate which had been slurried in an additional 50 grams of benzene. The reaction mixture was stirred at room temperature for two hours and then warmed to 80° C. and stirred for one additional hour. A dark-purple reaction mixture resulted, which was cooled to room temperature and treated with crushed ice to decompose and dissolve the aluminum chloride-complex, after which the benzene layer was separated. This layer was washed successively with water, 10% hydrochloric acid solution, and water, and the washed material was dried with anhydrous magnesium sulfate. The dried product was then distilled under vacuum at a temperature of 50° C. to remove the unconverted benzene and obtain 12.8 grams of residue, amounting to 70.3% by weight of bibenzyl based on the carbyl sulfate charge. The residue was identified by comparing its melting point and infrared analysis with those of a known sample of bibenzyl, and by determination of the mixed melting point of the material with bibenzyl. No other product was found in the reaction mixture.

*Example II*

A mixture the same as that used in Example I was prepared and reacted without heating for one hour. An examination of the reaction product demonstrated that bibenzyl was formed but in lower yield than in Example I. The yield was about 11% based on the carbyl sulfate.

*Example III*

A reaction mixture similar to that used in Example I, except that one mol of toluene is used in place of benzene initially placed in the flask, and 50 cc. of toluene is used in place of benzene for slurrying the carbyl sulfate. The reaction mixture is heated to about 110° C. and after washing, drying, and distilling as in Example I, the resulting product is 1,2-ditolylethane. A yield of 70–80% is obtained.

*Example IV*

Aromatic-rich reformate obtained by hydroreforming gasoline with a platinum catalyst is used as charging stock in another test in which the quantities and reaction conditions of Example I are repeated. Increase in the average molecular weight of the reaction product indicates that an appreciable amount of bimolecular alkylation product is formed.

Although a considerable excess of the aromatic reactant over that required to react with the carbyl sulfate is used in the foregoing examples, and as previously pointed out, an excess of the aromatic compound is preferred, the ratio can be as low as two mols of the aromatic material to one mol of carbyl sulfate.

It will be seen that I have succeeded in developing a new synthesis for the preparation of 1,2-diarylethane compounds and other compounds in which two carbocyclic radicals are connected by an ethylene radical, or a substituted ethylene radical if a homologue of carbyl sulfate is used.

The embodiments of the invention in which an exclusive property or privilege is claimed are defined as follows:

1. The method of preparing compounds having two aromatic radicals connected by a hydrocarbon radical selected from the group of unsubstituted and substituted ethylene radicals comprising reacting an aromatic compound with a carbyl sulfate selected from the group of carbyl sulfate and homologues of carbyl sulfate in the presence of a Friedel-Crafts catalyst, said aromatic compound being free of substituents reactive in the reaction environment.

2. The method of preparing compounds having the structural formula $R-CH_2-CH_2-R$ in which R is an aromatic radical attached to the $CH_2$ group through a ring carbon atom, comprising reacting carbyl sulfate with an aromatic compound, corresponding to R with an additional hydrogen atom on the ring carbon attached to the $CH_2$ group, in the presence of a Friedel-Crafts catalyst, said aromatic radical being free of substituents reactive in the reaction environment.

3. The method in accordance with claim 1 in which the aromatic compound is an aromatic hydrocarbon compound.

4. The method in accordance with claim 3 in which the aromatic hydrocarbon compound is benzene.

5. The method in accordance with claim 4 in which the catalyst is aluminum chloride.

6. The method in accordance with claim 4 in which the reaction is conducted at a temperature of approximately 80° C.

7. The method in accordance with claim 3 in which the aromatic hydrocarbon compound is toluene and the catalyst is aluminum chloride.

8. The method in accordance with claim 1 in which the aromatic compounds are the mixed aromatic compounds contained in an aromatized petroleum oil fraction.

No references cited.